US006553443B1

(12) United States Patent
Baqai et al.

(10) Patent No.: US 6,553,443 B1
(45) Date of Patent: Apr. 22, 2003

(54) METHOD AND APPARATUS FOR PRIORITIZING INTERRUPTS IN A COMMUNICATION SYSTEM

(75) Inventors: Imran Baqai, Austin, TX (US); Jeffrey Jay Anderson, Austin, TX (US); Michael A. Nix, Buda, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/406,936

(22) Filed: Sep. 28, 1999

(51) Int. Cl.[7] ............................................. G06F 13/26
(52) U.S. Cl. ...................... 710/264; 710/263; 710/260
(58) Field of Search ................. 710/260, 263, 710/264, 265, 262

(56) References Cited

U.S. PATENT DOCUMENTS

| | | | | |
|---|---|---|---|---|
| 4,156,796 A | * | 5/1979 | O'Neal et al. ................. 178/3 |
| 4,277,648 A | * | 7/1981 | Glassman .................... 379/111 |
| 4,481,574 A | * | 11/1984 | DeFino et al. ......... 379/102.02 |
| 4,513,175 A | * | 4/1985 | Smith ......................... 379/130 |
| 4,878,240 A | * | 10/1989 | Lin et al. .................... 379/198 |
| 5,381,552 A | * | 1/1995 | Dahlberg et al. ....... 340/825.51 |
| 5,564,060 A | * | 10/1996 | Mahalingaiah et al. ..... 710/260 |
| 5,764,996 A | * | 6/1998 | Armstrong et al. ......... 710/260 |
| 6,081,867 A | * | 6/2000 | Cox ............................ 710/260 |
| 6,185,652 B1 | * | 2/2001 | Shek et al. ................. 710/263 |
| 6,279,064 B1 | * | 8/2001 | Bronson et al. ............ 710/112 |
| 6,298,410 B1 | * | 10/2001 | Jayakumar et al. ......... 710/261 |

FOREIGN PATENT DOCUMENTS

EP   0657806 A1  *  6/1994
EP   0730230 A2  *  9/1996

OTHER PUBLICATIONS

"Hardware Managed Interrupt Status Queue and Manual Vector Generator for Multiple Channel Communications Controller," Sep. 1991, IBM Technical Disclosure Bulletin, vol. 34, No. 4B, pp. 131–137.*

AMD, Inc., "Am79Q02/021/031 Quad Subscriber Line Audio–Processing Circuit (QSLAC™) Devices," pp. 1–64, Feb., 1996.

* cited by examiner

*Primary Examiner*—Xuan M. Thai
(74) *Attorney, Agent, or Firm*—Williams, Morgan & Amerson, P.C.

(57) ABSTRACT

A communications system includes a communications channel, a first processing unit; and interface unit, and an interrupt controller. The first processing unit is adapted to monitor the communications channel and provide a plurality of status bits. The interface unit includes an interrupt register. The interrupt controller is adapted to identify a plurality of interrupts in response to changes in the status bits. Each interrupt has a priority, and the interrupt controller is adapted to store selected interrupts in the interrupt register in an order determined by the priority of the interrupts. A method includes monitoring a communications channel. A plurality of status bits associated with the monitoring are provided. A plurality of interrupts are identified based on changes in the status bits, each interrupt having a priority. Selected interrupts are stored in an interrupt queue in an order determined by the priority of the interrupts.

53 Claims, 6 Drawing Sheets

| IR 290 | Global IR 300 | Hook IR 305 | GNK IR 310 | Signal IR 315 | Channel1 320 | Channel0 325 |

METHOD AND APPARATUS FOR PRIORITIZING INTERRUPTS IN A COMMUNICATION SYSTEM

BACKGROUND OF THE INVENTION

1. Field of the Invention

This invention relates generally to monitoring the status of channels in a communications system, and, more particularly, to a method and apparatus for generating and prioritizing interrupts based on changes in the status of the communications channels.

2. Description of the Related Art

Telecommunications systems often use a centralized switching office as a common point for connection to multiple subscribers. Often multiple subscriber lines are supported by shared equipment. The degree of sharing depends, in part, on the demands placed on the equipment by the individual and collective subscriber lines.

In a typical installation, multiple subscriber lines are coupled to a shared line card. The line card includes circuitry for monitoring the status of the subscriber line by determining if the line is in use (e.g., off-hook), the type of signals being transmitted (e.g., modem, voice), the presence of touch tone signals, otherwise known as dual-tone multifrequency (DTMF) signals, etc. The line card may also include circuitry for detecting electrical problems, such as faults or transients, on the subscriber line.

A plurality of line cards are typically associated with a single shared processing resource, such as a microprocessor. Resources of the microprocessor are allocated to the line cards to determine changes in the status and to respond to such changes. Each line card usually includes one or more status registers indicating its particular condition. The shared microprocessor continuously polls the status registers of each line card to identify changes thereto. Such continuous polling consumes processing resources of the microprocessor, thereby limiting the number of line cards supportable by the microprocessor.

The present invention is directed to overcoming, or at least reducing the effects of, one or more of the problems set forth above.

SUMMARY OF THE INVENTION

One aspect of the present invention is seen in a communications system including a communications channel, a first processing unit; and interface unit, and an interrupt controller. The first processing unit is adapted to monitor the communications channel and provide a plurality of status bits. The interface unit includes an interrupt register. The interrupt controller is adapted to identify a plurality of interrupts in response to changes in the status bits. Each interrupt has a priority, and the interrupt controller is adapted to store selected interrupts in the interrupt register in an order determined by the priority of the interrupts.

Another aspect of the invention is seen in a method including monitoring a communications channel. A plurality of status bits associated with the monitoring are provided. A plurality of interrupts are identified based on changes in the status bits, each interrupt having a priority. Selected interrupts are stored in an interrupt queue in an order determined by the priority of the interrupts.

BRIEF DESCRIPTION OF THE DRAWINGS

The invention may be understood by reference to the following description taken in conjunction with the accompanying drawings, in which like reference numerals identify like elements, and in which:

FIG. 3 is a diagram illustrating the partitioning of an interrupt register used in the microprocessor interface of FIG. 2;

Figure 1:
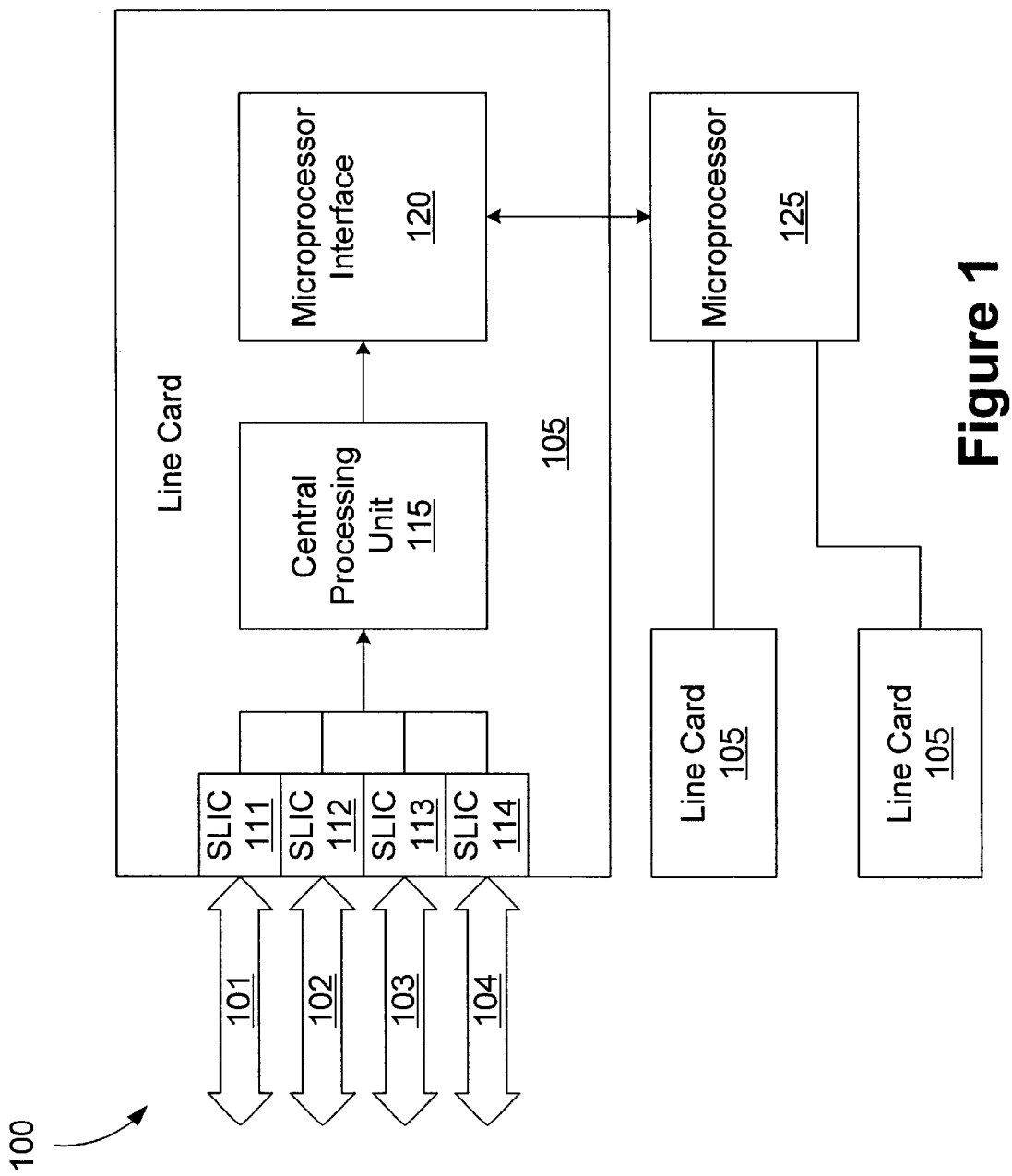
FIG. 1 is a simplified block diagram of a multiple channel communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of a communications system 100 is shown. The communications system 100 includes four communications channels 101, 102, 103, 104 coupled to a line card 105. As is known to those of ordinary skill in the art, the line card 105 is typically located at the central switching office of a service provider (e.g., telephone company). In the illustrated embodiment, the communications channels 101, 102, 103, 104 represent common twisted pair telephone lines coupled to telephone subscribers. In general, the line card 105 acts as the interface between the subscriber and the central switching office. Although four communications channels 101, 102, 103, 104 are illustrated, it is contemplated that any number of channels may be used.

Exemplary functions of the line card 105 include handling incoming (i.e., by detecting ringing) and outgoing calls (i.e., by detecting an off-hook condition and monitoring for touch tone signals), providing power to the subscriber telephone, monitoring the connection to detect faults, etc. Techniques and hardware for performing these functions are well known to those of ordinary skill in the art, and for clarity and ease of illustration, they are not described in greater detail herein. The present invention is described as it might be implemented in a typical telephone system for illustrative purposes, however, the application of the invention is not so limited.

The line card 105 includes subscriber line interface circuits (SLIC) 111, 112, 113, 114 for each of the communications channels 101, 102, 103, 104. A central processing unit 115 monitors the SLICs 111, 112, 113, 114 to identify changes in the status of the communications channels 101, 102, 103, 104. The central processing unit 115 provides a plurality of status bits to a microprocessor interface 120. The microprocessor interface 120 identifies changes in the status bits and generates interrupt signals based thereon. The microprocessor interface 120 provides the interrupt signals to a microprocessor 125 for servicing. In the illustrated embodiment, the microprocessor 125 may be remote from the line card 105, and may service a plurality of individual line cards 105 as shown.

The status bits employed by the central processing unit 115 are summarized below in Table 1. Some of the bits are global (i.e., common to all of the communications channels 101, 102, 103, 104), and some of the bits are repeated for each of the communications channels 101, 102, 103, 104). Specific techniques for determining the status items described in Table 1 are known to those of ordinary skill in the art, and are not further described herein. Also, the list of status items shown in FIG. 1 is illustrative, not exhaustive. It is contemplated that other status items may be monitored, in addition to, or in place of, the status items shown in Table 1.

TABLE 1

Status Bits

| Status Bit | Global/Channel | Status Description |
| --- | --- | --- |
| PINT | global | Positive battery power interruption |
| LINT | global | Low battery power interruption |
| HINT | global | High battery power interruption |
| CFAIL | global | Clock or frame-sync interruption |
| HOOK | 1 per channel | Subscriber phone is off the hook |
| GNK | 1 per channel | Ground-key signaling bit |
| AST | 1 per channel | Feed-curve in anti-saturation region |
| ICON | 1 per channel | Feed-curve in current limit region |
| TEMPA | 1 per channel | SLIC device in thermal overload |
| TESTX | 1 per channel | Ringing zero-crossing or test complete |
| NDIG | 1 per channel | New digit for DTMF detector |
| MTONE | 1 per channel | Modem tone detected |
| DCFAULT | 1 per channel | DC fault detected |
| ACFAULT | 1 per channel | AC fault detected |

The status bits of Table 1 are grouped into three levels for processing by the microprocessor interface 120. The PINT, LINT, HINT, and CFAIL bits have the highest priority and are collectively referred to as global bits. The HOOK and GNK bits have the second-highest priority and are collectively referred to as HG bits. The remaining bits have the lowest priority and are referred to as signaling bits.

Figure 2:
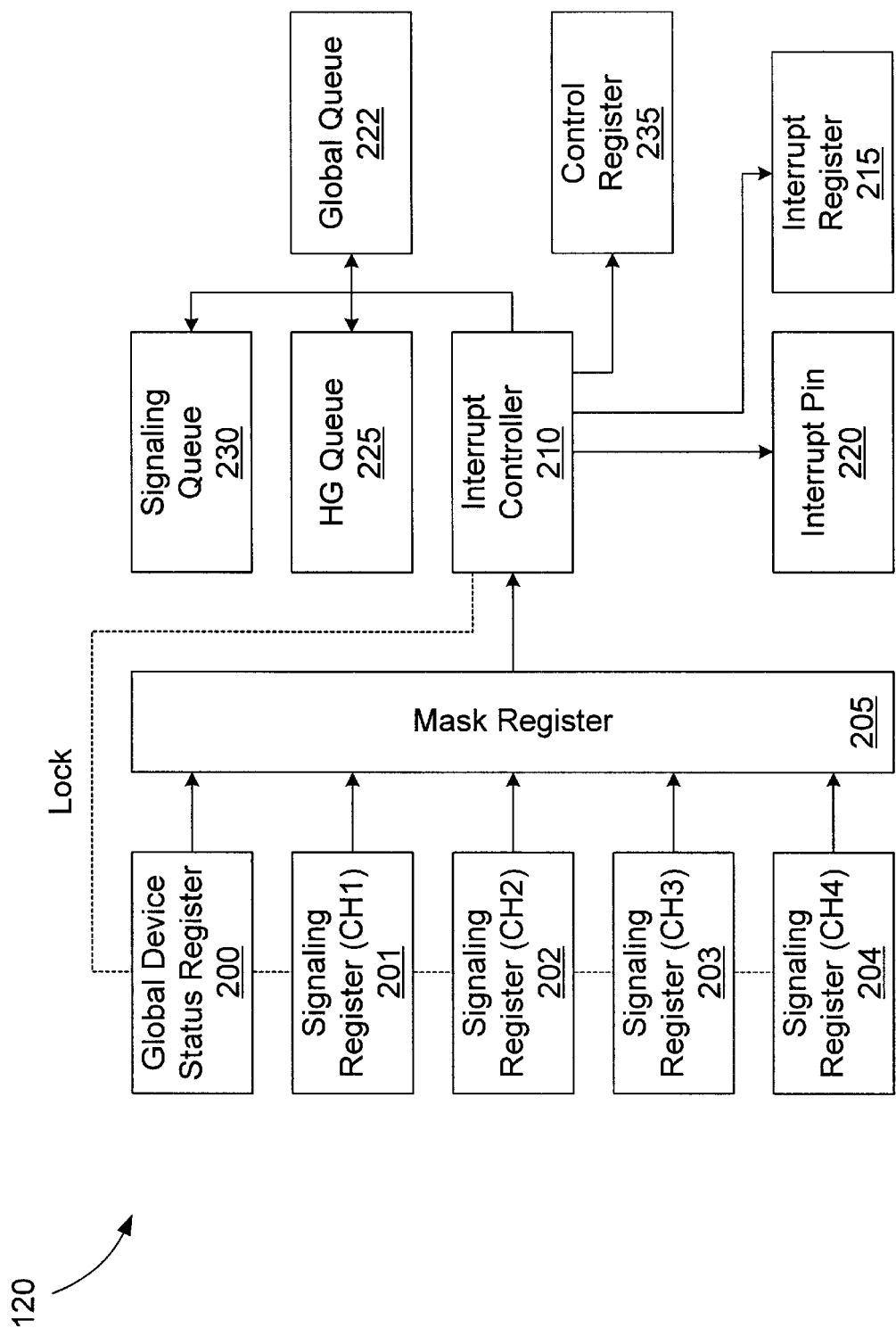
FIG. 2 is a simplified block diagram of a microprocessor interface in a line card of the communications system of FIG. 1.

Turning now to FIG. 2, a simplified block diagram of the microprocessor interface 120 is provided. The microprocessor interface 120 includes a global device status register 200 for storing the global status bits, and one signaling register 201, 202, 203, 204 for storing the HG and signaling bits for each of the respective communications channels 101, 102, 103, 104.

The microprocessor interface 120 includes a mask register 205 that is programmable to mask any or all of the status bits. Masking selected status bits is useful for diagnosing various problems. For example, an interrupt generated by a status bit having a high priority may prevent a lower priority interrupt from being registered. Masking the higher priority status bit by programming the mask register 205 allows the lower priority interrupt to register. Also, at power-up, the mask register 205 defaults to a condition in which all of the interrupts are masked. During initialization, the microprocessor 125 (shown in FIG. 1) selects those status bits to enable. It is contemplated that the mask register 205 may comprise a single register as shown, or multiple individual mask registers (not shown).

An interrupt controller 210 identifies that one of the unmasked status bits has changed, and loads an interrupt register 215 with information indicating the nature of the status change. The interrupt controller 210 also asserts an interrupt signal on an interrupt pin 220 based on the status bit change. While an interrupt is being asserted, the interrupt controller 210 locks selected other status bits and prevents them from changing until after the interrupt has been serviced and cleared. If a global bit change initiated the interrupt, the other global bits are locked. If an HG bit change triggers the interrupt, the other HG status bit for the same channel is locked. For example if the HOOK bit for the second channel 102 causes the interrupt, the GNK bit for the second channel 102 is locked. If a signaling bit change causes an interrupt, the other signaling bits for the same channel are locked.

If an unlocked status bit changes during an active interrupt, the pending interrupt is entered in either a global queue 222, an HG queue 225, or a signaling queue 230, depending on the particular status bit causing the interrupt. Again, the other status bits related to the same channel are locked. Accordingly, the global queue 222 may hold one pending interrupt, the HG queue 225 may hold four pending interrupts (i.e., one per channel), and the signaling queue 230 may hold four pending interrupts (i.e., one per channel).

A control register 235 stores information controlling the operation of the interrupt controller. One bit stored in the control register 235 is an unlock all bit (ULALL) used to determine how an interrupt is cleared. The use of the ULALL bit is described in greater detail below in reference to FIG. 5.

The interrupt controller 210 asserts interrupts in the order they are received, subject to priority considerations. Global bit interrupts have the highest priority. After a current interrupt is cleared, a pending global interrupt takes precedence over any other pending interrupt. HG bit interrupts have the second highest priority, taking precedence over any pending signaling bit interrupts and being asserted in order of receipt. Finally, signaling bit interrupts are asserted in the order they are received if no other interrupts are pending.

After a current interrupt is cleared, the interrupt controller 210 pauses for a period of time before asserting the next pending interrupt. In the illustrated embodiment, the interrupt controller 210 waits for about 10 microseconds before asserting another interrupt.

Referring briefly to FIG. 3, a diagram illustrating the partitioning of the interrupt register 215 is provided. The interrupt register 215 stores information related to the nature of the interrupt being currently asserted. The interrupt register 215 includes an interrupt (IR) bit 290 indicating that there is a current interrupt (ie., of any type) currently asserted and a global IR bit 300 indicating the interrupt was asserted as a result of a global bit change. A Hook IR bit 305 and a GNK IR bit 310 indicate that a HOOK or GNK bit change triggered the interrupt, respectively. A signaling IR bit 315 indicates that a signaling bit triggered the current interrupt. Channel bits 320, 325 indicate the particular communications channel 101, 102, 103, 104 associated with the non-global interrupts.

The IR bit 290 is useful where multiple line cards 105 are controlled by the microprocessor 125. The IR bits 290 may be coupled (e.g., hard wired) to an OR gate (not shown) to signal the microprocessor 125 of the interrupt. The microprocessor 125 may then poll each of the line cards 105 to determine the particular line card 105 that triggered the interrupt.

Figure 4:
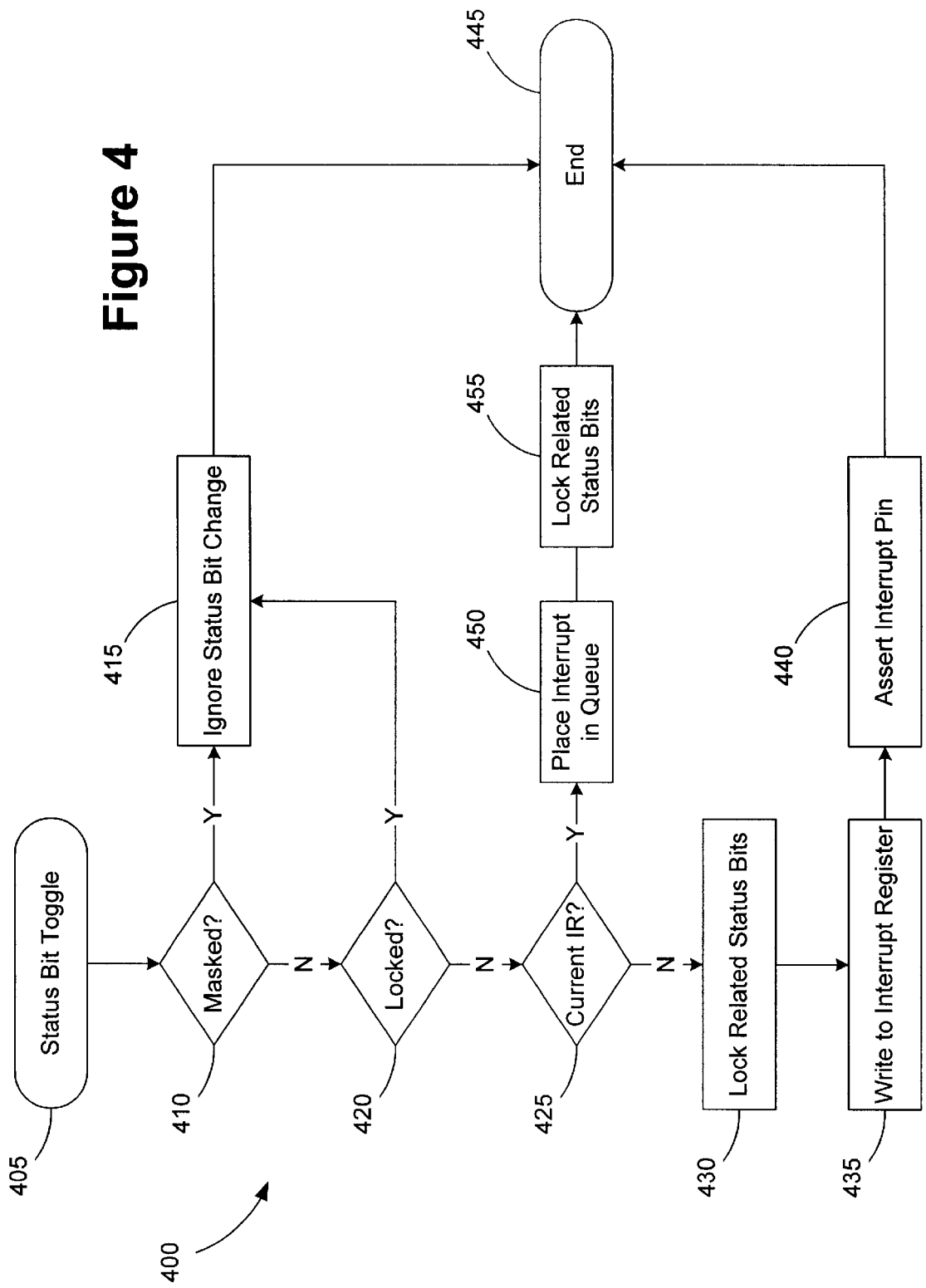
FIG. 4 is a flow chart illustrating a method for generating an interrupt signal in accordance with the present invention.
Figure 5:
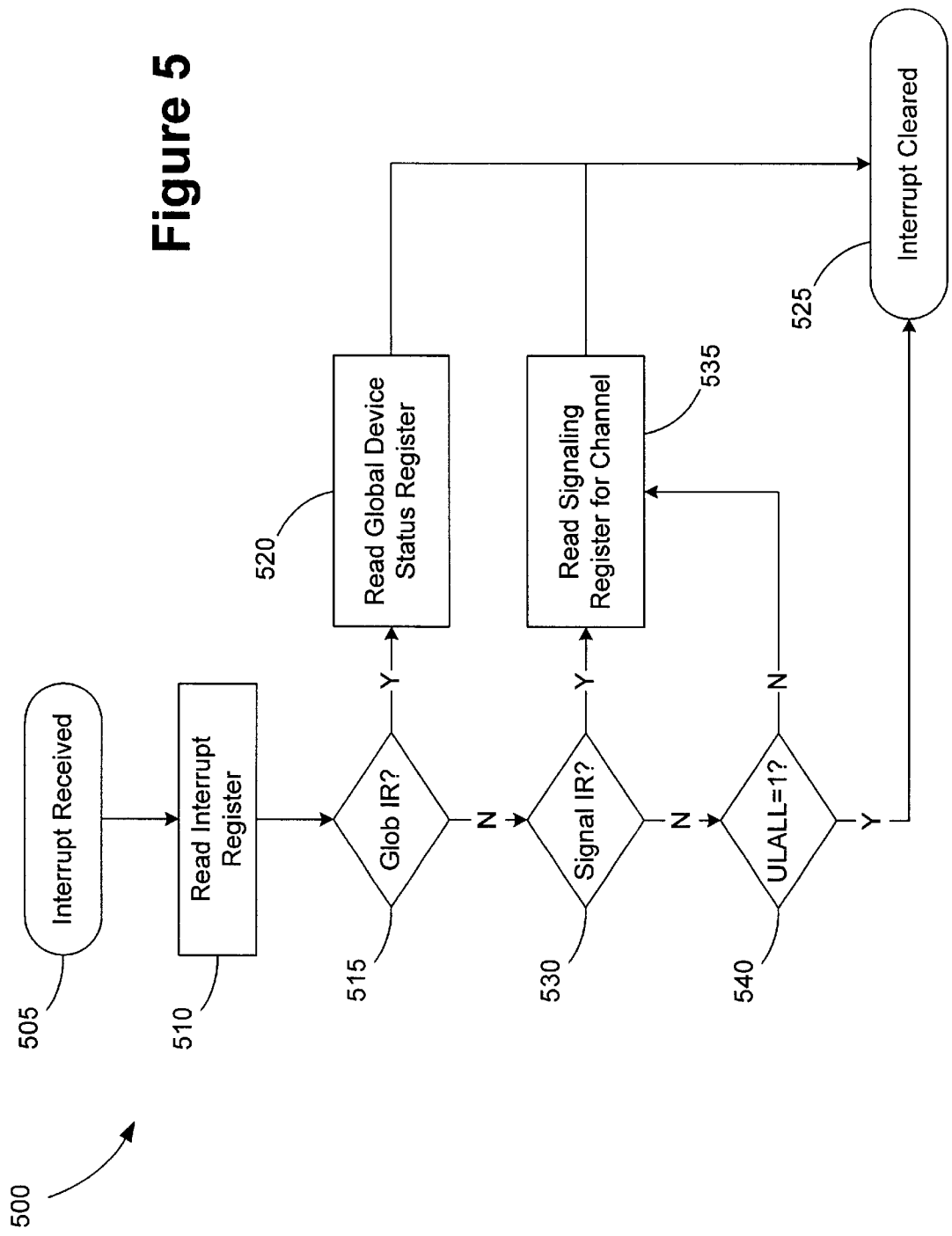
FIG. 5 is a flow chart illustrating a method for servicing the interrupt signal generated by the performance of the method illustrated in FIG. 4.
Figure 6:
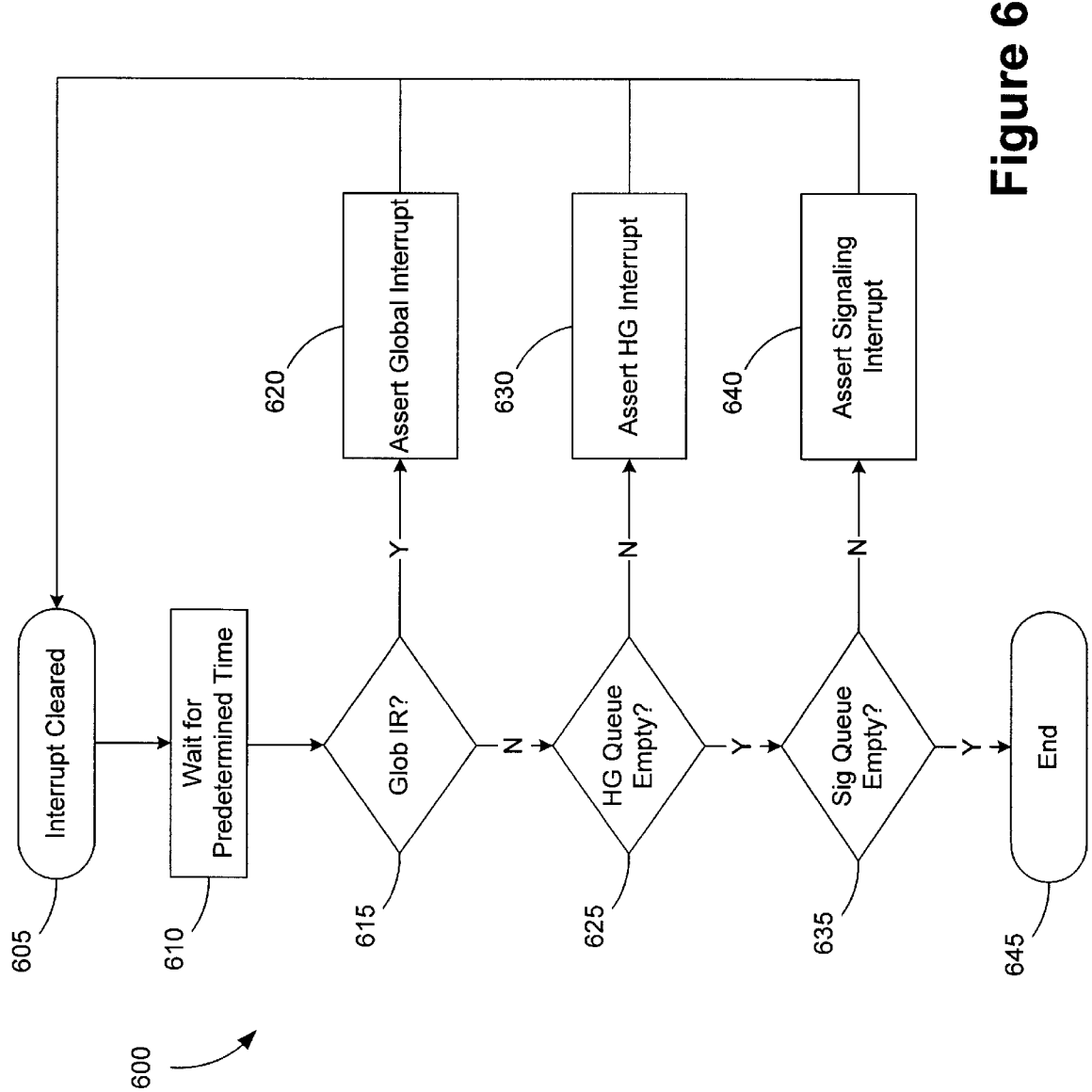
FIG. 6 is a flow chart illustrating a method for prioritizing multiple interrupts generated by the performance of the method illustrated in FIG. 4.

The operation of the interrupt controller 210 for registering and queuing interrupts is described in greater detail below in reference to FIGS. 4, 5, and 6. FIG. 4 is a flow chart illustrating a method 400 for generating an interrupt signal, FIG. 5 is a flow chart illustrating a method 500 for servicing the interrupt signal, and FIG. 6 is a flow chart illustrating a method 600 for prioritizing multiple interrupts. In the description of the methods shown in FIGS. 4, 5, and 6, reference will be made to the components shown and previously described above in reference to FIGS. 2 and 3.

Turning now to FIG. 4, the toggling of a status bit is identified by the interrupt controller 210 in block 405. In block 410, the mask register 205 is queried to determine if the status bit is masked. If masked, the status bit change is ignored in block 415. If not masked, the status bit may still be locked in block 420 due to a pending interrupt of the same priority for the same channel. If the status bit is locked, the status bit toggle is ignored in block 415. If not locked, the interrupt controller 210 determines if another interrupt is currently being asserted in block 425. If no other interrupt is being asserted, the bits associated with the toggled status bits are locked in block 430, the interrupt controller 210 writes to the interrupt register 215 information to identify the interrupt in block 435, and an interrupt signal is asserted at the interrupt pin 220 in block 440. The method ends in block 445.

If current interrupt was being asserted in block 425, the pending interrupt was entered into the proper queue 222, 225, 230 in block 450, and the status bits related to the pending interrupt are locked in block 455. Again, the method ends in block 445.

FIG. 5 illustrates the manner in which an interrupt may be cleared by the microprocessor 125 after servicing the interrupt. When in interrupt is received in block 505, the microprocessor 125 reads the interrupt register 215 in block 510. Based on the information in the interrupt register 215, the microprocessor 125 may determine the nature of the interrupt and take appropriate action. If the interrupt is a global interrupt in block 515 (i.e., global IR bit 300 set), the microprocessor 125 reads the global device status register 200 in block 520, and the interrupt is cleared in block 525 in response thereto.

If the interrupt is a signaling interrupt in block 530 (i.e., signal IR bit 315 set), the signaling register 201, 202, 203, 204 designated by the channel bits 320, 325 is read in block 535, and the interrupt is cleared in block 525 in response thereto. If the interrupt is not a signaling interrupt in block 530, by default, the interrupt is an HG interrupt. The method for clearing the HG interrupt depends on the status of the ULALL bit stored in the control register 235. If the ULALL bit is set in block 540, the interrupt is cleared in block 525 in response to the read of the interrupt register that occurred in block 510. Otherwise, the signaling register 201, 202, 203, 204 designated by the channel bits 320, 325 is read in block 535, and the interrupt is cleared in block 525.

It is contemplated that a current interrupt may also be cleared by a hardware reset, a software reset, or a write to the mask register 205. In the illustrated embodiment, software reset may be issued per channel. Thus, only a current interrupt for the channel receiving the software reset is cleared. Pending interrupts are not affected. In the illustrated embodiment, a hardware reset clears all active and pending interrupts, and a write to the mask register 205 clears any current interrupt (i.e., not any pending interrupts).

Turning now to FIG. 6, the prioritization method 600 used by the interrupt controller 210 is shown. When a current interrupt is cleared in block 605 (i.e., per the method of FIG. 5), the interrupt controller 210 waits for a predetermined period of time in block 610 (e.g., 10 microseconds) before asserting any pending interrupts. If a global interrupt is pending in block 615, the global interrupt is asserted in block 620, and the method 600 restarts at block 605 when the interrupt is cleared. If no global interrupt is pending in block 615, and the HG queue 225 is not empty in block 625, the pending HG interrupt is asserted in block 630 (i.e., in order of receipt). If the HG queue 225 is empty in block 625, and the signaling queue 230 is not empty in block 635, the pending signaling interrupt is asserted in block 640 (i.e., in order of receipt). If the signaling queue 230 is empty in block 635, the method 600 ends until a new interrupt is registered in accordance with the method 400 of FIG. 4.

Asserting the interrupts in blocks 620, 630, and 640 includes performing the steps in FIG. 4 of locking the related status bits (i.e., block 430), writing to the interrupt register 215 (i.e., block 435), and asserting the interrupt signal at the interrupt pin 220 (i.e., block 440).

Prioritizing and asserting interrupts as described above provides numerous advantages. The ability to mask specific interrupt triggers increases troubleshooting flexibility. Also, using the interrupt system to signal the microprocessor 125 only when action is needed increases the efficiency of the microprocessor 125, and may allow more line cards 105 to be supported by a single microprocessor 125. Another advantage is that line conditions requiring immediate action may take priority over other conditions, thus increasing the robustness of the system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A communications system, comprising:
   a communications channel;
   a first processing unit adapted to monitor the communications channel and provide a plurality of status bits; and
   an interface unit, including:
      an interrupt register; and
      an interrupt controller adapted to identify a plurality of interrupts in response to changes in the status bits, each interrupt having a type and a priority based on the type, and to store selected interrupts in the interrupt register in an order determined by the priority of the interrupts.

2. The communications system of claim 1, wherein the interrupt controller is adapted to clear the selected interrupt stored in the interrupt register based on the interrupt register being read.

3. The communications system of claim 1, wherein the interface unit further includes an interrupt pin and the interrupt controller is adapted to assert an interrupt signal at the interrupt pin coincident with storing the selected interrupt in the interrupt register.

4. The communications system of claim 1, wherein the interrupt controller is adapted to pause for a predetermined time interval between storing the selected interrupts in the interrupt register.

5. The communications system of claim 4, wherein the predetermined time interval is about 10 microseconds.

6. The communications system of claim 1, wherein the interface unit further includes:
a status register adapted to receive the status bits; and
an interrupt queue adapted to store the plurality of interrupts, wherein the interrupt controller is adapted to store the interrupts in the interrupt queue in response to changes to the status bits stored in the status register.

7. The communications system of claim 6, wherein the interrupt controller is adapted to lock at least one of the other status bits in the status register associated with the status bit causing a selected interrupt.

8. The communications system of claim 7, wherein the interrupt controller is adapted to prevent changes to the locked status bits in the status register.

9. The communications system of claim 6, further comprising a plurality of communication channels, wherein each channel has an associated subset of status bits in the status register.

10. The communications system of claim 9, wherein the interrupt controller is adapted to generate a first interrupt in response to a change in one of the status bits in a particular subset and lock the other status bits in the particular subset.

11. The communications system of claim 10, wherein the status bits include a plurality of global status bits and the interrupt controller is adapted to generate the first interrupt in response to a change in one of the global status bits and lock the other global status bits.

12. The communications system of claim 6, wherein the interrupt controller is adapted to clear the selected interrupt stored in the interrupt register based on the status register being read.

13. The communications system of claim 6, further comprising a second processing unit adapted to read the selected interrupts from the interrupt register.

14. The communications system of claim 13, wherein the second processing unit is further adapted to read at least the status bits in the status register associated with the selected interrupt.

15. The communications system of claim 14, wherein the interrupt controller is adapted to clear the selected interrupt in response to at least one of the second processing unit reading the interrupt register and the second processing unit reading the status register.

16. The communications system of claim 1, wherein the interface unit includes a mask register adapted to store a plurality of mask bits corresponding to at least a subset of the status bits, and the interrupt controller is adapted to ignore changes in the status bits with an asserted mask bit.

17. A communications system, comprising:
a communications channel;
a first processing unit adapted to monitor the communications channel and provide a plurality of status bits; and
an interface unit, including:
an interrupt register;
a status register adapted to receive the status bits;
an interrupt controller adapted to identify a plurality of interrupts in response to changes in the status bits, each interrupt having a priority, and to store selected interrupts in the interrupt register in an order determined by the priority of the interrupts; and
an interrupt queue adapted to store the plurality of interrupts, wherein the interrupt controller is adapted to store the interrupts in the interrupt queue in response to changes to the status bits stored in the status register.

18. The communications system of claim 17, wherein the interrupt controller is adapted to lock at least one of the other status bits in the status register associated with the status bit causing a selected interrupt.

19. The communications system of claim 18, wherein the interrupt controller is adapted to prevent changes to the locked status bits in the status register.

20. The communications system of claim 17, further comprising a plurality of communication channels, wherein each channel has an associated subset of status bits in the status register.

21. The communications system of claim 20, wherein the interrupt controller is adapted to generate a first interrupt in response to a change in one of the status bits in a particular subset and lock the other status bits in the particular subset.

22. The communications system of claim 21, wherein the status bits include a plurality of global status bits and the interrupt controller is adapted to generate the first interrupt in response to a change in one of the global status bits and lock the other global status bits.

23. The communications system of claim 17, wherein the interrupt controller is adapted to clear the selected interrupt stored in the interrupt register based on the status register being read.

24. The communications system of claim 17, further comprising a second processing unit adapted to read the selected interrupts from the interrupt register.

25. The communications system of claim 24, wherein the second processing unit is further adapted to read at least the status bits in the status register associated with the selected interrupt.

26. The communications system of claim 25, wherein the interrupt controller is adapted to clear the selected interrupt in response to at least one of the second processing unit reading the interrupt register and the second processing unit reading the status register.

27. A communications system, comprising:
a communications channel;
a first processing unit adapted to monitor the communications channel and provide a plurality of status bits; and
an interface unit, including:
an interrupt register;
an interrupt controller adapted to identify a plurality of interrupts in response to changes in the status bits, each interrupt having a type and a priority based on the type, and to store selected interrupts in the interrupt register in an order determined by the priority of the interrupts; and
a mask register adapted to store a plurality of mask bits corresponding to at least a subset of the status bits, and the interrupt controller is adapted to ignore changes in the status bits with an asserted mask bit.

28. A method, comprising:

monitoring a communications channel;

providing a plurality of status bits associated with the monitoring;

identifying a plurality of interrupts based on changes in the status bits, each interrupt having a type and priority based on the type; and storing selected interrupts in an interrupt queue in an order determined by the priority of the interrupts.

29. The method of claim 28, further comprising clearing the selected interrupt stored in the interrupt register based on the interrupt register being read.

30. The method of claim 28, further comprising asserting an interrupt signal at an interrupt pin coincident with storing the selected interrupt in the interrupt register.

31. The method of claim 28, further comprising pausing for a predetermined time interval between storing the selected interrupts in the interrupt register.

32. The method of claim 31, wherein pausing for the predetermined time interval includes pausing for about 10 microseconds.

33. The method of claim 28, further comprising reading the selected interrupts from the interrupt register.

34. The method of claim 33, further comprising reading at least the status bits in the status register associated with the selected interrupt.

35. The method of claim 34, further comprising clearing the selected interrupt in response to at least one of reading the interrupt register and reading the status register.

36. The method of claim 28, further comprising:

storing the status bits in a status register; and storing the plurality of interrupts in an interrupt queue adapted to store the plurality of interrupts in response to changes to the status bits stored in the status register.

37. The method of claim 36, further comprising locking at least one of the other status bits associated with the status bit causing a selected interrupt.

38. The method of claim 37, wherein locking the status bits includes preventing changes to the locked status bits in the status register.

39. The method of claim 28, further comprising:

masking selected status bits; and ignoring changes in the masked status bits.

40. The method of claim 39, wherein masking selected status bits includes storing mask bits in a mask register, the mask bits being associated with at least a subset of the status bits.

41. The method of claim 28, further comprising:

monitoring a plurality of communications channels; and providing a plurality of status bits associated with the monitoring, each channel having an associated subset of status bits.

42. The method of claim 41, further comprising:

generating a first interrupt in response to a change in one of the status bits in a particular subset; and locking the other status bits in the particular subset.

43. The method of claim 42, wherein the status bits include a plurality of global status bits, generating the first interrupt includes generating the first interrupt in response to a change in one of the global status bits, and locking the other status bits includes locking the other global status bits.

44. A method, comprising:

monitoring a communications channel;

providing a plurality of status bits associated with the monitoring;

storing the status bits in a status register;

identifying a plurality of interrupts based on changes in the status bits, each interrupt having a priority;

storing selected interrupts in an interrupt queue in an order determined by the priority of the interrupts in response to changes to the status bits stored in the status register.

45. The method of claim 44, further comprising locking at least one of the other status bits associated with the status bit causing a selected interrupt.

46. The method of claim 45, wherein locking the status bits includes preventing changes to the locked status bits in the status register.

47. The method of claim 44, further comprising:

monitoring a plurality of communications channels; and providing a plurality of status bits associated with the monitoring, each channel having an associated subset of status bits.

48. The method of claim 47, further comprising:

generating a first interrupt in response to a change in one of the status bits in a particular subset; and locking the other status bits in the particular subset.

49. The method of claim 48, wherein the status bits include a plurality of global status bits, generating the first interrupt includes generating the first interrupt in response to a change in one of the global status bits, and locking the other status bits includes locking the other global status bits.

50. The method of claim 44, further comprising clearing the selected interrupt stored in the interrupt register based on the status register being read.

51. A method, comprising:

monitoring a communications channel;

providing a plurality of status bits associated with the monitoring;

identifying a plurality of interrupts based on changes in the status bits, each interrupt having a priority;

masking selected status bits;

ignoring changes in the masked status bits; and storing selected interrupts in an interrupt queue in an order determined by the priority of the interrupts.

52. The method of claim 51, wherein masking selected status bits includes storing mask bits in a mask register, the mask bits being associated with at least a subset of the status bits.

53. A communications system, comprising:

means for monitoring a communications channel;

means for providing a plurality of status bits associated with the monitoring;

means for identifying a plurality of interrupts based on changes in the status bits, each interrupt having a type and a priority based on the type; and means for storing selected interrupts in an interrupt queue in an order determined by the priority of the interrupts.

* * * * *